No. 659,590. Patented Oct. 9, 1900.
A. MÜHLBERG.
TRUCK FOR AUTOCARS.
(Application filed June 30, 1900.)
(No Model.)

Attest
Inventor:
Albert Mühlberg
By Philipp Sawyer Rice & Kennedy
Attys

UNITED STATES PATENT OFFICE.

ALBERT MÜHLBERG, OF BERLIN, GERMANY.

TRUCK FOR AUTOCARS.

SPECIFICATION forming part of Letters Patent No. 659,590, dated October 9, 1900.

Application filed June 30, 1900. Serial No. 22,180. (No model.)

*To all whom it may concern:*

Be it known that I, ALBERT MÜHLBERG, a citizen of the Swiss Republic, chief engineer, residing at No. 43 Unter den Linden, Berlin, Kingdom of Prussia, German Empire, have invented new and useful Trucks for Autocars, of which the following is a specification.

The object of my invention is to provide a truck for autocars which being flexible in every direction prevents or reduces shocks arising from the irregular condition of the roads.

In the trucks of the self-propelled vehicles hitherto built the hind axle is connected to the front one by a frame. In order to counteract the strains caused by the irregular condition of the road, either of the two following arrangements is resorted to. Either the leading axle is pivotally attached to a horizontal pin fixed to the truck or the whole of the latter is built of flexible jointed parts in such a manner that the axles can take, in their respective vertical planes, positions forming with each other a certain angle, the magnitude of which depends upon the flexibility of the arrangement and the elasticity of the materials constituting the latter. Both arrangements have inherent disadvantages. In the first arrangement the oscillations of the leading axle in its vertical plane impart a heavy lateral rocking motion to the vehicle-body, as in this case the lateral oscillations of the body are taken up solely by the road-springs and the body and truck rest in the front part of the vehicle on one point only—namely, the pivot of the axle. The second arrangement is subjected to strains which escape all control and in a short time loosen the connections of the truck, the life of which is thereby considerably shortened.

My invention has for its object to remedy these defects, and to this end I so arrange the individual constituent parts of the truck that each one of them possesses that degree of mobility which is called for by the uneven nature of the road, elastic bodies, such as springs, being interposed between the various parts for the purpose of absorbing the momentum to the shocks, jerks, and variations of speed that take place while traveling on a rough road.

Figure 1:
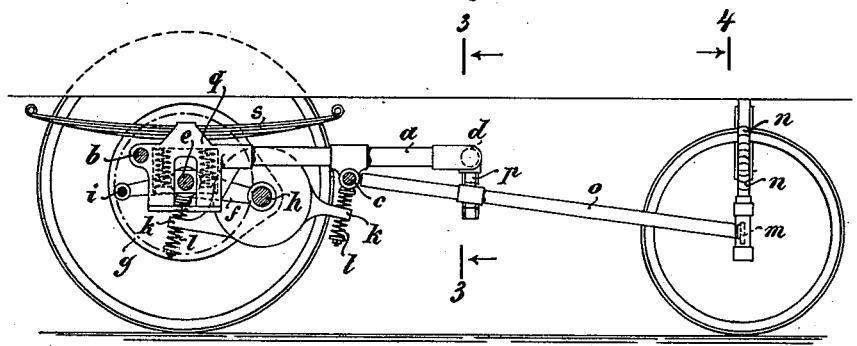
Figure 2:
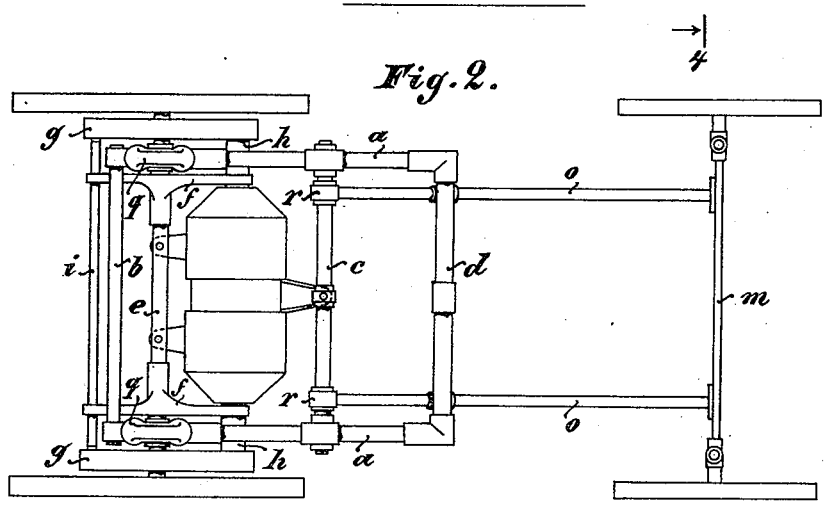
Figure 4:
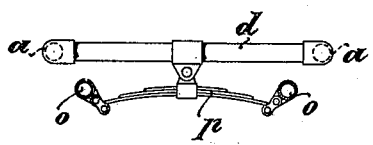
Figure 3:
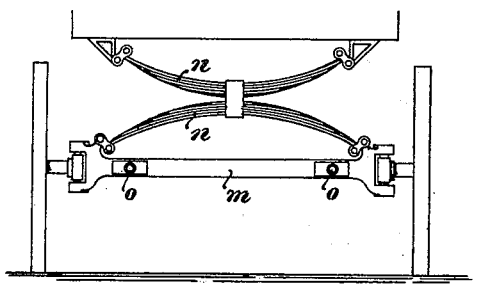

In the accompanying drawings is represented, in Figure 1, a side elevation; in Fig. 2, a plan view, and in Fig. 3 a front elevation. Fig. 4 shows the attachment of the spring of the front frame to the hind frame.

My truck consists of the three following frame arrangements, each one of which has a certain amount of mobility: first, the rear frame; second, the driving or motor frame, and, third, the front frame.

The rear frame consists of a rigid frame embracing the rear axle by means of spring-cups $q$ and resting on these springs, which absorb the shocks caused by the running over a paved road. The rigid frame is constituted by longitudinal, $a$, and transverse stays $b$, $c$, and $d$, whereby the body of the vehicle rests on springs $s$, located above this frame.

The driving or motor frame consists of the rear axle $e$, a swinging frame $f$ embracing the latter and supporting the bearings of the motors and their casing. The motor-frame comprises also the wheel-gear casings $g$, which are held in position on one side by a cylindrical extension $h$ of the swinging frame $f$, said extension being concentric with the shaft of the motor, and on the other side by a stay-rod $i$ of the said swinging frame. The turning of the motor-casings around their axles is limited by projection $k$ and spiral springs $l$, while the rear axle $e$ is capable of rotation in guiding-blocks located between the spring-cups $q$. The whole of the motor-frame and motor can swing around and parallel to the rear axle. The amplitude of this swing is, however, limited by the front helical spring $l$, which is attached to the stretcher $c$ of the rear frame. This front spring $l$ keeps, therefore, the motor-frame in a suspended position, which may, so far as the springs in spring-cups $q$ admit, take with the rear axle a position oblique to the rear frame.

The front frame consists of a leading axle $m$, the wheels of which rotate on journals adapted to turn around a vertical axis for the purpose of steering the vehicle in curves. Between the front axle and the vehicle-body I interpose a double transverse spring $n$, which permits of the said axle taking an oblique position in the vertical plane and at the same time greatly reduces the lateral oscillation of the vehicle-body. To counteract these forces, which act in the direction of the motion of the vehicle, the front axle is connected to the rear frame in such a manner that they embrace and can rotate on the stay $c$ of said frame at $r$. On the other hand, these rods are connected by a spring $p$ to the stay $d$ of the rear frame, Fig. 3, for the purpose of keeping the latter in its horizontal position. This spring $p$ effects an equalization of the strains between the rods $o$ when the front axle assumes an oblique position, in which case the positions occupied by these rods are at different levels. Rods $o$ have a certain amount of lateral and diametral play, so that they give way in either direction by a corresponding amount at their point of attachment, and thus allow of the front axle occupying an oblique position in a vertical plane.

Having thus described my said invention and ascertained the manner in which it is performed, I declare that what I claim is—

1. In trucks for autocars or self-propelled vehicles the combination with a motor-frame of a rear frame, a front frame, connecting-rods between the rear and front frames and springs securing said rods to the rear frame, substantially as and for the purpose described.

2. In trucks for autocars or self-propelled vehicles the combination with a motor-frame, of a rear frame, a front frame, connecting-rods flexibly jointed by means of springs to the rear frame and rigidly jointed to the front frame, substantially as and for the purpose described.

3. In trucks for autocars or self-propelled vehicles the combination with a motor-frame, of a rear frame, a front frame, connecting-rods one end of which is loosely movable on one of the transverse stays of the rear frame and flexibly jointed to the other transverse stay by means of springs, the other end of said connecting-rods being jointed to the front frame, substantially as and for the purpose described.

4. In trucks for autocars or self-propelled vehicles the combination with a motor-frame, of a rear frame, a front frame, means for flexibly connecting the front frame and the motor-frame to the rear frame whereby the motor-frame is formed into a rigid system by the connection of the wheel-gear casings by means of cross-stays and suspension-links, substantially as and for the purpose described.

In testimony whereof I have hereunto set my hand in presence of two subscribing witnesses.

ALBERT MÜHLBERG.

Witnesses:
WOLDEMAR HAUPT,
HENRY HASPER.